(12) United States Patent
Arai

(10) Patent No.: US 10,550,962 B2
(45) Date of Patent: Feb. 4, 2020

(54) STEEL MATERIAL AND OIL-WELL STEEL PIPE

(71) Applicant: NIPPON STEEL & SUMITOMO METAL CORPORATION, Tokyo (JP)

(72) Inventor: Yuji Arai, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/076,705

(22) PCT Filed: Feb. 20, 2017

(86) PCT No.: PCT/JP2017/006151
§ 371 (c)(1),
(2) Date: Aug. 9, 2018

(87) PCT Pub. No.: WO2017/150251
PCT Pub. Date: Sep. 8, 2017

(65) Prior Publication Data
US 2019/0063641 A1 Feb. 28, 2019

(30) Foreign Application Priority Data
Mar. 4, 2016 (JP) .................. 2016-041773

(51) Int. Cl.
*F16L 9/02* (2006.01)
*C22C 38/54* (2006.01)
(Continued)

(52) U.S. Cl.
CPC .................... *F16L 9/02* (2013.01); *B32B 1/08* (2013.01); *B32B 15/011* (2013.01); *B32B 15/013* (2013.01); *C21D 6/004* (2013.01); *C21D 6/005* (2013.01); *C21D 6/007* (2013.01); *C21D 6/008* (2013.01); *C21D 8/105* (2013.01); *C21D 9/08* (2013.01); *C21D 9/085* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/10* (2013.01); *C22C 38/105* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/28* (2013.01); *C22C 38/32* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *F16L 9/00* (2013.01); *C21D 2211/001* (2013.01); *C21D 2211/002* (2013.01); *C21D 2211/008* (2013.01); *Y10T 428/12799* (2015.01); *Y10T 428/12917* (2015.01); *Y10T 428/12951* (2015.01); *Y10T 428/12958* (2015.01); *Y10T 428/12965* (2015.01); *Y10T 428/12972* (2015.01); *Y10T 428/12979* (2015.01); *Y10T 428/13* (2015.01)

(58) Field of Classification Search
CPC ........ C21D 2211/002; C21D 2211/008; C21D 2211/001; C21D 8/10; C21D 8/105; C21D 9/08; C21D 6/008; C21D 6/007; C21D 6/005; C21D 9/085; C21D 6/004; C22C 38/05; C22C 38/54; C22C 38/52; C22C 38/48; C22C 38/46; C22C 38/44; C22C 38/42; C22C 38/32; C22C 38/30; C22C 38/28; C22C 38/24; C22C 38/22; C22C 38/20; C22C 38/06; C22C 38/04; C22C 38/02; C22C 38/005; C22C 38/002; C22C 38/001; C22C 38/00; C22C 38/10; C22C 38/08; C22C 38/105; C22C 38/12; C22C 38/14; C22C 38/16; C22C 38/50; C22C 38/18; C22C 38/40; F16L 9/02; F16L 9/00; B32B 1/08; B32B 15/011; B32B 15/013; Y10T 428/12799; Y10T 428/12917; Y10T 428/12951; Y10T 428/12958; Y10T 428/12965; Y10T 428/12972; Y10T 428/12979; Y10T 428/13
See application file for complete search history.

(56) References Cited

U.S. PATENT DOCUMENTS

| | | | | |
|---|---|---|---|---|
| 4,407,681 A | * | 10/1983 | Ina .......................... | C22C 38/10 148/330 |
| 2005/0123434 A1 | * | 6/2005 | Sandberg ............... | C21D 6/002 420/109 |
| 2019/0226063 A1 | * | 7/2019 | Arai ....................... | C22C 38/00 |

FOREIGN PATENT DOCUMENTS

| | | |
|---|---|---|
| JP | 56-5949 | 1/1981 |
| JP | 57-35622 | 2/1982 |
| JP | 59-177350 | 10/1984 |

* cited by examiner

Primary Examiner — Michael E. La Villa
(74) Attorney, Agent, or Firm — Clark & Brody

(57) ABSTRACT

The steel material according to this invention contains, in mass %, C: 0.15 to 0.45%, Si: 0.10 to 1.0%, Mn: 0.10 to less than 0.90%, P: 0.05% or less, S: 0.01% or less, Al: 0.01 to 0.1%, N: 0.01% or less, Cr: 0.1 to 2.5%, Mo: 0.35 to 3.0%, and Co: 0.50 to 3.0%, and satisfies expressions (1) and (2), and contains 90% or more of tempered martensite by volume ratio:

C+Mn/6+(Cr+Mo+V)/5+(Cu+Ni)/15−Co/6+α≥0.50   (1)

(3C+Mo+3Co)/(3Mn+Cr)≥1.0   (2)

Effective B=B−11(N−Ti/3.4)/14   (3)

where, α in expression (1) is 0.250 when effective B (mass %) defined by expression (3) is 0.0003% or more, and is 0 when the effective B is less than 0.0003.

17 Claims, 4 Drawing Sheets

(51) Int. Cl.
*C22C 38/52* (2006.01)
*C22C 38/50* (2006.01)
*C22C 38/48* (2006.01)
*C22C 38/46* (2006.01)
*C22C 38/44* (2006.01)
*C22C 38/42* (2006.01)
*C22C 38/06* (2006.01)
*C22C 38/04* (2006.01)
*C22C 38/02* (2006.01)
*C22C 38/00* (2006.01)
*C21D 9/08* (2006.01)
*C21D 8/10* (2006.01)
*C21D 6/00* (2006.01)
*C22C 38/10* (2006.01)
*C22C 38/20* (2006.01)
*C22C 38/24* (2006.01)
*C22C 38/32* (2006.01)
*C22C 38/28* (2006.01)
*C22C 38/08* (2006.01)
*C22C 38/22* (2006.01)
*C22C 38/18* (2006.01)
*C22C 38/12* (2006.01)
*C22C 38/40* (2006.01)
*C22C 38/14* (2006.01)
*C22C 38/16* (2006.01)
*B32B 15/01* (2006.01)
*B32B 1/08* (2006.01)
*F16L 9/00* (2006.01)

STEEL MATERIAL AND OIL-WELL STEEL PIPE

TECHNICAL FIELD

The present invention relates to a steel material and an oil-well steel pipe, and more particularly relates to a steel material and an oil-well steel pipe which are suited for use in a sour environment.

BACKGROUND ART

Due to the deepening of oil wells and gas wells (hereunder, oil wells and gas wells are collectively referred to as "oil wells"), there is a demand to enhance the strength of oil-well steel pipes. Specifically, 80 ksi grade (yield stress is 80 to 95 ksi, that is, 551 to 654 MPa) and 95 ksi grade (yield stress is 95 to 1 1 0 ksi, that is, 654 to 758 MPa) oil-well steel pipes are being widely utilized.

Many deep wells are in a sour environment containing hydrogen sulfide that is corrosive. Oil-well steel pipes that are used in such sour environments are required to have not only a high strength, but to also have sulfide stress cracking resistance (hereunder, referred to as "SSC resistance").

Steels with a high strength and enhanced hydrogen embrittlement resistance characteristics (SSC resistance and delayed fracture resistance) are proposed in Japanese Patent Application Publication No. 56-5949 (Patent Literature 1) and Japanese Patent Application Publication No. 57-35622 (Patent Literature 2). The steels disclosed in the aforementioned Patent Literatures contain Co, and thus enhance the hydrogen embrittlement resistance characteristics (SSC resistance and delayed fracture resistance).

Specifically, a high tensile strength steel disclosed in Patent Literature 1 is obtained by quenching and tempering steel having a chemical composition containing C: 0.05 to 0.50%, Si: 0.10 to 0.28%, Mn: 0.10 to 2.0%, Co: 0.05 to 1.50% and Al: 0.01 to 0.10%, with the balance being Fe and unavoidable impurities, and has a yield stress of 60 kg/mm$^2$ or more.

A high-strength oil-well steel disclosed in Patent Literature 2 is obtained by subjecting a steel having a chemical composition containing C: 0.27 to 0.50%, Si: 0.08 to 0.30%, Mn: 0.90 to 1.30%, Cr: 0.5 to 0.9%, Ni: 0.03% or less, V: 0.04 to 0.11%, Nb: 0.01 to 0.10%, Mo: 0.60 to 0.80%, Al: 0.1% or less and Co: 3% or less, with the balance being Fe and unavoidable impurities, in which the impurities contain P: 0.005% or less and S: 0.003% or less, to quenching at 880 to 980° C., and then tempering at 650 to 700° C.

CITATION LIST

Patent Literature

Patent Literature 1: Japanese Patent Application Publication No. 56-5949
Patent Literature 2: Japanese Patent Application Publication No. 57-35622

By the way, the conventional evaluation of the SSC resistance of a steel material has mainly been based on, for example, a tensile test or a bending test such as the Method A test or Method B test defined in NACE (National Association of Corrosion Engineers) TM0177.

However, since these tests use an unnotched test specimen, consideration is not given to SSC propagation arresting characteristics. Therefore, even in the case of a steel material that is evaluated as having excellent SSC resistance in the aforementioned tests, SSC arises in some cases due to propagation of latent cracks in the steel.

In addition, accompanying the deepening of oil wells and the like in recent years, the pressure of H$_2$S gas in sour environments has increased to around 5 to 15 atm. The steel material to be used in such high pressure H$_2$S environments is required to have more excellent SSC resistance than heretofore. To obtain excellent SSC resistance it is preferable to suppress not only the occurrence of SSC, but also to suppress the propagation of SSC. Consequently, in recent years, excellent SSC resistance having a high fracture toughness value K$_{ISSC}$ is required in a DCB (Double Cantilever Beam) test according to Method D defined in NACE TM0177.

In Patent Literature 1 and Patent Literature 2, the SSC resistance under a high pressure H$_2$S environment in which the H$_2$S partial pressure is from 5 to 15 atm is not evaluated, and it is possible that in some cases the fracture toughness value K$_{ISSC}$ under a high pressure H$_2$S environment is low.

SUMMARY OF INVENTION

Technical Problem

An object of the present invention is to provide a steel material that has excellent SSC resistance even under a high pressure H$_2$S environment.

Solution to Problem

A steel material according to the present invention has a chemical composition consisting of, in mass %, C: 0.15 to 0.45%, Si: 0.10 to 1.0%, Mn: 0.10 to less than 0.90%, P: 0.05% or less, S: 0.01% or less, Al: 0.01 to 0.1%, N: 0.01% or less, Cr: 0.1 to 2.5%. Mo: 0.35 to 3.0%, Co: 0.50 to 3.0%, Cu: 0 to 0.5%, Ni: 0 to 0.5%, Ti: 0 to 0.03%, Nb: 0 to 0.15%, V: 0 to 0.5%, B: 0 to 0.003%, Ca: 0 to 0.004%, Mg: 0 to 0.004%, Zr: 0 to 0.004%, and rare earth metal: 0 to 0.004%, with the balance being Fe and impurities, and satisfying expressions (1) and (2), wherein the microstructure contains, by volume ratio, 90% or more of tempered martensite:

$$C+Mn/6+(Cr+Mo+V)/5+(Cu+Ni)/15-Co/6+\alpha \geq 0.50 \quad (1)$$

$$(3C+Mo+3Co)/(3Mn+Cr) \geq 1.0 \quad (2)$$

$$\text{Effective } B=B-11(N-Ti/3.4)/14 \quad (3)$$

where, α in expression (1) is 0.250 when effective B (mass %) defined by expression (3) is 0.0003% or more, and is 0 when the effective B is less than 0.0003%. A content (mass %) of a corresponding element is substituted for each symbol of an element in expression (1) to expression (3).

Advantageous Effects of Invention

The steel material according to the present invention has excellent SSC resistance even under a high pressure H$_2$S environment.

DESCRIPTION OF EMBODIMENTS

The present inventors conducted investigations and studies regarding SSC resistance under a high pressure $H_2S$ environment of 5 to 15 atm, and obtained the following findings.

(1) Co improves SSC resistance. In particular, in a steel material having a chemical composition containing, in mass %, C: 0.15 to 0.45%, Si: 0.10 to 1.0%, Mn: 0.10 to less than 0.90%, P: 0.05% or less, S: 0.01% or less, Al: 0.01 to 0.1%, N: 0.010% or less, Cr: 0.1 to 2.5%, Mo: 0.35 to 3.0%, Cu: 0 to 0.5%, Ni: 0 to 0.5%, Ti: 0 to 0.03%, Nb: 0 to 0.15%, V: 0 to 0.5%, B: 0 to 0.003%, Ca: 0 to 0.004%, Mg: 0 to 0.004%, Zr: 0 to 0.004%, and rare earth metal: 0 to 0,004%, when Co is contained in an amount from 0.50% to 3.0%, excellent SSC resistance is obtained.

Figure 1:
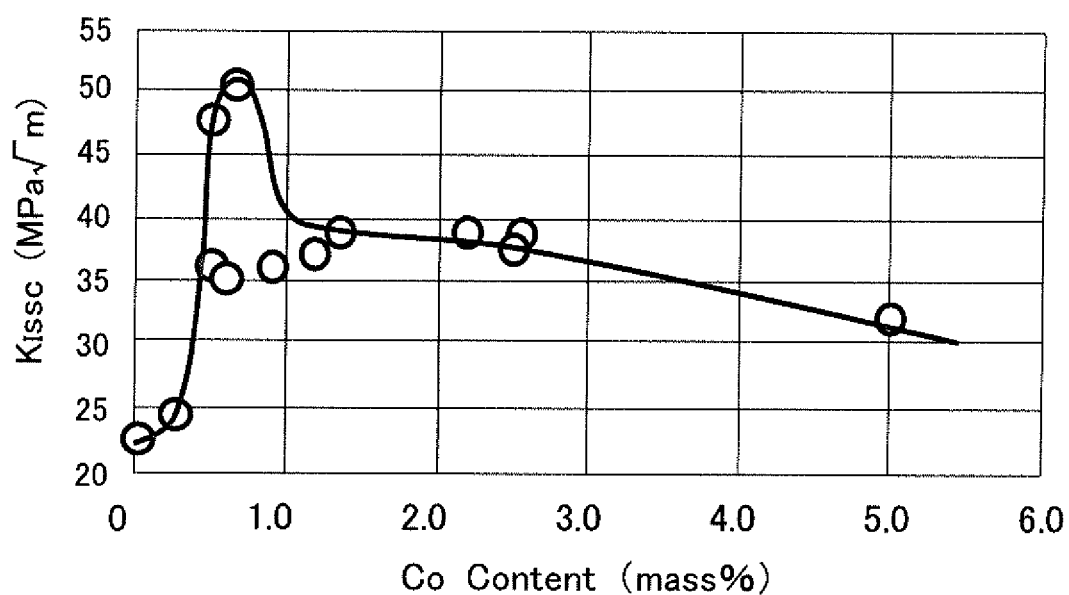
FIG. 1 is a view illustrating a relation between a Co content (mass %) and a fracture toughness value K$_{ISSC}$ (unit is MPa√m).

FIG. 1 is a view illustrating a relation between a Co content (mass %) and the fracture toughness value $K_{ISSC}$ (unit is MPa√m) under a high pressure $H_2S$ environment that was obtained based on DCB tests of examples that are described later. Referring to FIG. 1, it is found that as the Co content increases from 0%, the fracture toughness value $K_{ISSC}$ rapidly increases and becomes 35 MPa√m or more when the Co content is 0.50% or more. On the other hand, although the fracture toughness value $K_{ISSC}$ decreases when the Co content is more than 0.80%, when the Co content is more than 1.0%, the fracture toughness value $K_{ISSC}$ transitions almost constantly at a value that is higher than 35 MPa√m until the Co content reaches 3.0%. When the Co content is more than 3.0%, the fracture toughness value $K_{ISSC}$ gradually decreases and becomes less than 35 MPa√m.

In short, in the above described chemical composition, when the Co content is from 0.50 to 3.0%, a high fracture toughness value $K_{ISSC}$ is obtained, and excellent SSC resistance which can suppress propagation of SSC is obtained. Although the reason therefor is uncertain, it is considered that the reason is as follows. During use under a sour environment, Co concentrates in an outer layer of the steel material. Penetration of hydrogen into the steel is suppressed by the Co that is concentrated in the outer layer. It is considered that, by this means, the SSC resistance is improved.

(2) As described above, if a specific amount of Co is contained, excellent SSC resistance is obtained because of the concentration of Co in an outer layer. However, unlike other alloying element (C, Mn, Cr, V, Cu, Ni and the like), Co decreases the hardenability of steel. Accordingly, if the Co content is high in comparison to the content of C, Mn, Cr, V, Cu and Ni, the hardenability will decrease. In this case, the microstructure will be a heterogeneous structure consisting of not only tempered martensite, but also bainite or retained austenite. Therefore, the SSC resistance will decrease due to the microstructure. In this respect, as a result of studying the relation between Co and other alloying elements with respect to SSC resistance, the present inventors obtained the following findings.

If the chemical composition also satisfies expression (1) and expression (2), excellent SSC resistance is obtained while maintaining the hardenability:

$$C+Mn/6+(Cr+Mo+V)/5+(Cu+Ni)/15-Co/6+\alpha \geq 0.50 \quad (1)$$

$$(3C+Mo+3Co)/(3Mn+Cr) \geq 1.0 \quad (2)$$

$$\text{Effective } B=B-11(N-Ti/3.4)/14 \quad (3)$$

where, α in expression (1) is 0.250 when effective B (mass %) defined by expression (3) is 0.0003% or more, and is 0 when effective B is less than 0.0003%. A content (mass %) of the corresponding element is substituted for each symbol of an element in expression (1) to expression (3).

[Regarding Expression (1)]

F1 is defined as equal to $C+Mn/6+(Cr+Mo+V)/5+(Cu+Ni)/15-Co/6+\alpha$. F1 is an index of hardenability. C, Mn, Cr, Mo, V, Cu and a predetermined amount of effective B (dissolved B) improve the hardenability of steel. On the other hand, as mentioned above, Co lowers the hardenability of steel. If F1 is 0.50 or more, even if the steel contains Co, excellent hardenability is obtained and the volume ratio of tempered martensite in the microstructure can be raised.

In a case where the microstructure substantially consists of tempered martensite, excellent SSC resistance is obtained. On the other hand, in a case where the microstructure is a heterogeneous structure consisting of tempered martensite and other phases (bainite, retained austenite or the like), the SSC resistance decreases. In a case where F1 satisfies expression (1), the volume ratio of tempered martensite in the microstructure is 90% or more, and excellent SSC resistance is obtained.

[Regarding Expression (2)]

When F1 satisfies expression (1), the microstructure will be substantially tempered martensite. However, if the chemical composition contains an excessive amount of alloying elements, the SSC resistance will, on the contrary, decrease because the alloying elements will trap (accumulate) hydrogen in the steel material. Among elements that improve hardenability, in particular, although Mn and Cr improve hardenability, Mn and Cr can decrease SSC resistance. On the other hand, along with the above described Co, C and Mo are elements that improve the SSC resistance of steel.

F2 is defined as being equal to $(3C+Mo+3Co)/(3Mn+Cr)$. F2 is an index of SSC resistance.

Figure 2:
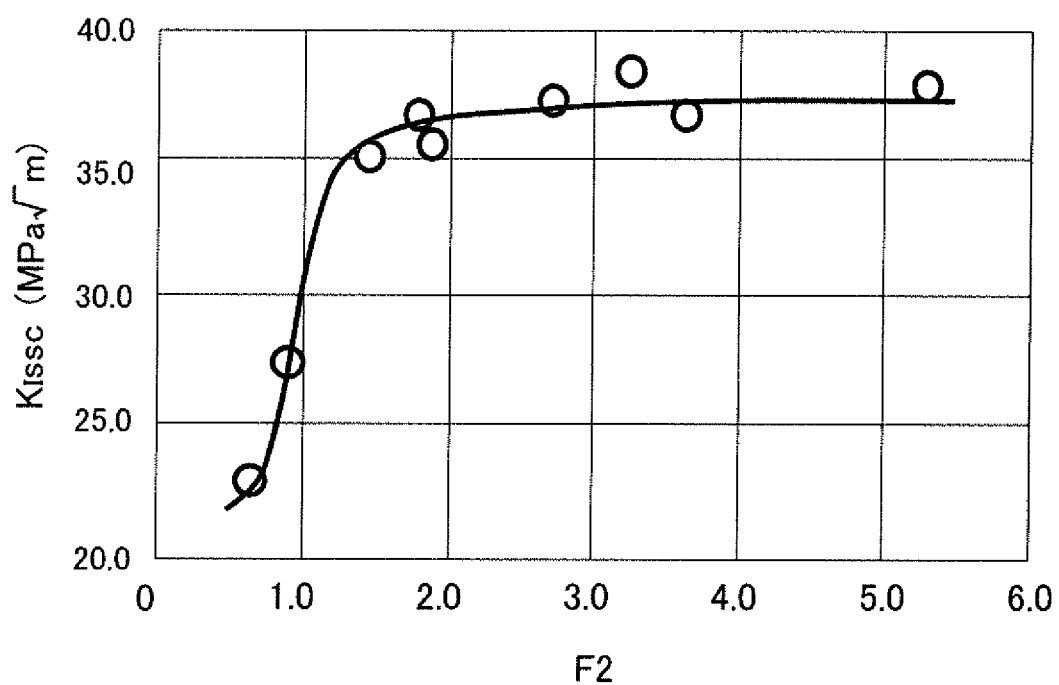
FIG. 2 is a view illustrating a relation between F2=(3C+Mo+3Co)/(3Mn+Cr) and a fracture toughness value K$_{ISSC}$ (unit is MPa√m).

FIG. 2 is a view illustrating the relation between F2 and the fracture toughness value $K_{ISSC}$ (unit is MPa√m). FIG. 2 was obtained based on DCB tests on the steel plates corresponding to C110 grade of the API standards in the examples to be described later. Referring to FIG. 2, it is found that the fracture toughness value $K_{ISSC}$ rapidly increases when F2 is in the vicinity of 1.0. When F2 is more than 1.0, the fracture toughness value $K_{ISSC}$ transitions almost constantly at a value that is higher than 35 MPa√m. That is, a point of inflection exists at which F2=1.0.

Based on the foregoing, when F2 is 1.0 or more, that is, when a ratio of the content of elements that improve SSC resistance (C, Mo and Co) to the content of Mn and Cr is large, excellent SSC resistance is obtained.

The steel material according to the present invention that has been completed based on the above findings has a chemical composition consisting of, in mass %, C: 0.15 to 0.45%, Si: 0.10 to 1.0%, Mn: 0.10 to less than 0.90%, P: 0.05% or less, S: 0.01% or less, Al: 0.01 to 0.1%, N: 0.010% or less, Cr: 0.1 to 2.5%, Mo: 0.35 to 3.0%, Co: 0.50 to 3.0%, Cu: 0 to 0.5%, Ni: 0 to 0.5%, Ti: 0 to 0.030%, Nb: 0 to 0.15%, V: 0 to 0.5%, B: 0 to 0.003%, Ca: 0 to 0.004%, Mg: 0 to 0.004%, Zr: 0 to 0.004%, and rare earth metal: 0 to 0.004%, with the balance being Fe and impurities, and satisfying expressions (1) and (2), wherein the microstructure contains, by volume ratio, 90% or more of tempered martensite:

$$C+Mn/6+(Cr+Mo+V)/5+(Cu+Ni)/15-Co/6+\alpha \geq 0.50 \quad (1)$$

$$(3C+Mo+3Co)/(3Mn+Cr) \geq 1.0 \quad (2)$$

$$\text{Effective } B=B-11(N-Ti/3.4)/14 \quad (3)$$

where, $\alpha$ in expression (1) is 0.250 when effective B (mass %) defined by expression (3) is 0.0003% or more, and is 0 when effective B is less than 0.0003%. A content (mass %) of a corresponding element is substituted for each symbol of an element in expression (1) to expression (3).

The above described chemical composition may contain one or more types of element selected from a group consisting of Cu: 0.02 to 0.5% and Ni: 0.02 to 0.5%.

The above described chemical composition may contain one or more types of element selected from a group consisting of Ti: 0.003 to 0.03%, Nb: 0.003 to 0.15% and V: 0.005 to 0.5%.

The above described chemical composition may contain B: 0.0003 to 0.003%.

The above described chemical composition may contain one or more types of element selected from a group consisting of Ca: 0.0003 to 0.004%, Mg: 0.0003 to 0.004%, Zr: 0.0003 to 0.004%, and rare earth metal: 0.0003 to 0.004%.

By having the above described chemical composition, an oil-well steel pipe according to the present invention exhibits an excellent strength and SSC resistance, even with a wall thickness of 15 mm or more.

Hereunder, the steel material of the present invention is described in detail. The symbol "%" in relation to an element means "mass %" unless specifically stated otherwise.

[Chemical Composition]

The chemical composition of the steel material according to the present invention contains the following elements.

C: 0.15 to 0.45%

Carbon (C) improves hardenability and increases the strength of the steel. In addition, C promotes spheroidization of carbides at the time of tempering during the production process, thereby improving the SSC resistance. C also binds with Mo or V to form carbides, thereby improving temper softening resistance. If the carbides are dispersed, the strength of the steel increases further. These effects will not be obtained if the C content is too low. On the other hand, if the C content is too high, the toughness of the steel will decrease and quench cracking is liable to occur. Therefore, the C content is from 0.15 to 0.45%. A preferable lower limit of the C content is 0.20%, and more preferably is 0,25%. A preferable upper limit of the C content is 0.40%, and more preferably is 0.35%.

Si: 0.10 to 1.0%

Silicon (Si) deoxidizes the steel. If the Si content is too low, this effect is not obtained. On the other hand, if the Si content is too high, retained austenite is excessively generated and the SSC resistance decreases. Accordingly, the Si content is from 0.10 to 1.0%. A preferable lower limit of the Si content is 0.15%, and more preferably is 0.20%. A preferable upper limit of the Si content is 0.55%, and more preferably is 0.40%.

Mn: 0.10 to less than 0.90%

Manganese (Mn) deoxidizes the steel. Mn also increases the hardenability of the steel, and increases the steel strength. If the Mn content is too low, these effects are not obtained. On the other hand, if the Mn content is too high, Mn segregates at the grain boundaries together with impurities such as phosphorus (P) and sulfur (S). In such a case, the SSC resistance of the steel decreases. Accordingly, the Mn content is from 0.10 to less than 0.90%. A preferable lower limit of the Mn content is 0.25%, and more preferably is 0.28%. A preferable upper limit of the Mn content is 0.80%.

P: 0.05% or less

Phosphorus (P) is an impurity. P segregates at the grain boundaries and decreases the SSC resistance of the steel. Accordingly, the P content is 0.05% or less. A preferable P content is 0.02% or less. Preferably, the P content is as low as possible.

S: 0.01% or less

Sulfur (S) is an impurity. S segregates at the grain boundaries and decreases the SSC resistance of the steel. Accordingly, the S content is 0.01% or less. A preferable S content is 0.005% or less, and more preferably is 0.003% or less. Preferably, the S content is as low as possible.

Al: 0.01 to 0.1%

Aluminum (Al) deoxidizes the steel. If the Al content is too low, this effect is not obtained and the SSC resistance of the steel decreases. On the other hand, if the Al content is too high, coarse oxide inclusions arise and the SSC resistance of the steel decreases. Accordingly, the Al content is from 0.01 to 0.1%. A preferable lower limit of the Al content is 0.015%, and more preferably is 0.020%. A preferable upper limit of the Al content is 0.06%, and more preferably is 0.050%. In the present description, the "Al" content means "acid-soluble Al", that is, the content of "sol. Al".

N: 0.010% or less

Nitrogen (N) is unavoidably contained. N forms coarse nitrides and decreases the SSC resistance of the steel. Accordingly, the N content is 0.010% or less. A preferable N content is 0.005% or less, and more preferably is 0.004% or less. Preferably, the N content is as low as possible. However, in a case where a certain amount of Ti is included for the purpose of refining the crystal grain by precipitation of fine nitrides, it is preferable to include N in an amount of 0.002% or more.

Cr: 0.1 to 2.5%

Chromium (Cr) improves the hardenability of the steel, and increases the strength of the steel. If the Cr content is too low, the aforementioned effects are not obtained. On the other hand, if the Cr content is too high, the SSC resistance of the steel decrease. Accordingly, the Cr content is from 0.1 to 2.5%. A preferable lower limit of the Cr content is 0.25%, and more preferably is 0.30%. A preferable upper limit of the Cr content is 1.5%, and more preferably is 1.3%.

Mo: 0.35 to 3.0%

Molybdenum (Mo) increases the hardenability of the steel. Mo also generates fine carbides, and increases the temper softening resistance of the steel, and improves the SSC resistance in a high pressure $H_2S$ environment. If the Mo content is too low, this effect is not obtained. On the other hand, if the Mo content is too high, the aforementioned effect saturates. Accordingly, the Mo content is from 0.35 to 3.0%. A preferable lower limit of the Mo content is 0.40%, more preferably is 0.50%, and further preferably is more than 0.70%. A preferable upper limit of the Mo content is 2.0%, and more preferably is 1.75%.

Co: 0.50 to 3.0%

Cobalt (Co) improves the SSC resistance of the steel in a high pressure $H_2S$ environment. Although the reason is not certain, the reason is considered to be as follows. In a sour environment, Co concentrates at the surface of the steel and suppresses the penetration of hydrogen into the steel. As a result, the SSC resistance of the steel improves. If the Co content is too low, this effect is not obtained. On the other hand, if the Co content is too high, the hardenability of steel decreases and the strength of the steel is lowered. Accordingly, the Co content is from 0.50 to 3.0%. A preferable lower limit of the Co content is more than 0.50%, more preferably is 0.7%, and more preferably is 1.0%. A preferable upper limit of the Co content is 2.5%, and more preferably is 2.0%.

The balance of the chemical composition of the steel material according to the present invention is Fe and impurities. Here, the term "impurities" refers to elements which, during industrial production of the steel material, are mixed in from ore or scrap that is used as a raw material of the steel material, or from the production environment or the like, and which are allowed within a range that does not adversely affect the steel material of the present invention.

[Optional Elements]

The chemical composition of the above described steel material may further contain one or more types of element selected from the group consisting of Cu and Ni as a substitute for a part of Fe. Each of these elements is an optional element, and each of these elements increases the strength of the steel.

Cu: 0 to 0.5%

Copper (Cu) is an optional element, and need not be contained in the steel. In a case where Cu is contained, the Cu increases the hardenability of the steel and enhances the steel strength. However, if the Cu content is too high, the Cu will trap hydrogen and the SSC resistance will decrease. Accordingly, the Cu content is from 0 to 0.5%. A preferable lower limit of the Cu content is 0.02%, and more preferably is 0.05%. A preferable upper limit of the Cu content is 0.35%, and more preferably is 0.25%.

Ni: 0 to 0.5%

Nickel (Ni) is an optional element, and need not be contained in the steel. In a case where Ni is contained, the Ni increases the hardenability of the steel and enhances the steel strength. However, if the Ni content is too high, local corrosion will be promoted and the SSC resistance will decrease. Accordingly, the Ni content is from 0 to 0.5%. A preferable lower limit of the Ni content is 0.02%, and more preferably is 0.05%. A preferable upper limit of the Ni content is 0.35%, and more preferably is 0.25%.

The chemical composition of the steel material that is described above may further contain one or more types of element selected from the group consisting of Ti, Nb and V as a substitute for a part of Fe. Each of these elements is an optional element, and each element increases the strength of the steel by forming at least any of carbides, nitrides and carbo-nitrides.

Ti: 0 to 0.03%

Titanium (Ti) is an optional element, and need not be contained in the steel. In a case where Ti is contained, the Ti forms nitrides, and refines crystal grains by the pinning effect. By this means, the strength of the steel is enhanced. However, if the Ti content is too high, the Ti nitrides coarsen and the SSC resistance of the steel decreases. Accordingly, the Ti content is from 0 to 0.03%. A preferable lower limit of the Ti content is 0.003%, and more preferably is 0.005%. A preferable upper limit of the Ti content is 0.015%, and more preferably is 0.012%.

Nb: 0 to 0.15%

Niobium (Nb) is an optional element, and need not be contained in the steel. In a case where Nb is contained, the Nb binds with C and/or N to form carbides, nitrides or carbo-nitrides (hereunder, referred to as "carbo-nitrides or the like"). These carbo-nitrides or the like refine the crystal grains and enhance the strength of the steel. However, if the Nb content is too high, coarse precipitates are generated and the SSC resistance of the steel decreases. Accordingly, the Nb content is from 0 to 0.15%. A preferable lower limit of the Nb content is 0.003%, and more preferably is 0.007%. A preferable upper limit of the Nb content is 0.050%, and more preferably is 0.04%.

V: 0 to 0.5%

Vanadium (V) is an optional element, and need not be contained in the steel. In a case where V is contained, the V forms carbo-nitrides or the like, and refines the crystal grains to enhance the strength of the steel. However, if the V content is too high, the toughness of the steel decreases. Accordingly, the V content is from 0 to 0.5%. A preferable lower limit of the V content is 0.005%, and more preferably is 0.015%. A preferable upper limit of the V content is 0.15%, and more preferably is 0.12%.

The chemical composition of the steel material that is described above may further contain B as a substitute for a part of Fe.

B: 0 to 0.003%

Boron (B) is an optional element, and need not be contained in the steel. In a case where B is contained, the B dissolves in the steel and increases the hardenability and enhances the strength of the steel. However, if the B content is too high, coarse nitrides will be generated and the SSC resistance of the steel will decrease. Accordingly, the B content is from 0 to 0.003%. A preferable lower limit of the B content is 0.0003%, and more preferably is 0.0007%. A preferable upper limit of the B content is 0.0015%, and more preferably is 0.0012%.

The chemical composition of the above described steel material may further contain one or more types of element selected from the group consisting of Ca, Mg, Zr, and rare earth metal as a substitute for a part of Fe. Each of these elements is an optional element, and each of these elements improves the form of sulfides to increase the SSC resistance of the steel.

Ca: 0 to 0.004%

Calcium (Ca) is an optional element, and need not be contained in the steel. In a case where Ca is contained, the Ca binds with S in the steel. By this means, sulfides in the steel are refined and the SSC resistance of the steel is improved. However, if the Ca content is too high, oxides in the steel coarsen and the SSC resistance of the steel decreases. Accordingly, the Ca content is from 0 to 0.004%. A preferable lower limit of the Ca content is 0.0003%, and more preferably is 0.0006%. A preferable upper limit of the Ca content is 0.0025%, and more preferably is 0.0020%.

Mg: 0 to 0.004%

Magnesium (Mg) is an optional element, and need not be contained in the steel. In a case where Mg is contained, the Mg refines sulfides in the steel and improves the SSC resistance of the steel. However, if the Mg content is too high, oxides in the steel coarsen and the SSC resistance of the steel decreases. Accordingly, the Mg content is from 0 to 0.004%. A preferable lower limit of the Mg content is 0.0003%, and more preferably is 0.0006%. A preferable upper limit of the Mg content is 0.0025% and more preferably is 0.0020%.

Zr: 0 to 0.004%

Zirconium (Zr) is an optional element, and need not be contained in the steel. In a case where Zr is contained, the Zr refines sulfides in the steel and improves the SSC resistance of the steel. However, if the Zr content is too high, oxides coarsen and the SSC resistance of the steel decreases. Accordingly, the Zr content is from 0 to 0.004%. A preferable lower limit of the Zr content is 0.0003%, and more preferably is 0.0006%. A preferable upper limit of the Zr content is 0.0025% and more preferably is 0.0020%.

Rare Earth Metal: 0 to 0.004%,

Rare earth metal (REM) is an optional element, and need not be contained in the steel. In a case where REM is contained, the REM refines sulfides in the steel and improves the SSC resistance of the steel. REM also bonds with P in the steel, and suppresses segregation of P at crystal grain boundaries. Consequently, a decrease in the SSC resistance of the steel that is due to segregation of P is suppressed. However, if the REM content is too high, oxides coarsen and the SSC resistance of the steel decreases. Accordingly, the REM content is from 0 to 0.004%. A preferable lower limit of the REM content is 0.0003%, and more preferably is 0.0006%. A preferable upper limit of the REM content is 0.0025% and more preferably is 0.0020%.

In the present description, the term "REM" means that at least one or more types of Sc, Y, and lanthanoid elements (from La, of atomic number 57, to Lu, of atomic number 71) are contained in the steel, and the term "REM content" means the total content of these elements.

[Regarding Expression (1) and Expression (2)]

The above described chemical composition further satisfies expression (1) and expression (2):

$$C+Mn/6+(Cr+Mo+V)/5+(Cu+Ni)/15-Co/6+\alpha \geq 0.50 \quad (1)$$

$$(3C+Mo+3Co)/(3Mn+Cr) \geq 1.0 \quad (2)$$

$$\text{Effective } B=B-11(N-Ti/3.4)/14 \quad (3)$$

where, $\alpha$ in expression (1) is 0.250 when effective B (mass %) defined by expression (3) is 0.0003% or more, and is 0 when effective B is less than 0.0003%. A content (mass %) of the corresponding element is substituted for each symbol of an element in expression (1) to expression (3).

[Regarding Expression (1)]

F1 is defined as equal to $C+Mn/6+(Cr+Mo+V)/5+(Cu+Ni)/15-Co/6+\alpha$. F1 is an index of hardenability. If F1 is 0.50 or more, even if the steel contains Co, excellent hardenability is obtained and the volume ratio of tempered martensite in the microstructure becomes 90% or more. As a result, excellent SSC resistance is obtained. A preferable lower limit of F1 is 0.70.

The value of $\alpha$ in F1 is determined according to the amount of effective B (amount of dissolved B) that is defined by expression (3). Specifically, $\alpha$ is 0.250 when effective B defined by expression (3) is 0.0003% or more, and is 0 when effective B is less than 0.0003%. If the effective B value defined by expression (3) is more than the B content, the value of effective B is taken as being equal to the B content.

[Regarding Expression (2)]

F2 is defined as equal to $(3C+Mo+3Co)/(3Mn+Cr)$. F2 is an index of SSC resistance. When F2 is 1.0 or more, the ratio of the content of elements that improve SSC resistance (C, Mo and Co) to the content of Mn and Cr (elements which although contributing to hardenability, can decrease SSC resistance if contained in an excessive amount) is large. As a result, excellent SSC resistance in a high pressure $H_2S$ environment is obtained.

[Microstructure]

The microstructure of the steel material of the present invention mainly consists of tempered martensite. More specifically, the microstructure contains, by volume ratio, 90% or more of tempered martensite. The balance of the microstructure is, for example, bainite and retained austenite or the like. When the microstructure contains 90% or more of tempered martensite by volume ratio, the SSC resistance improves. Preferably, the microstructure is a tempered martensite single-phase microstructure.

The volume ratio of tempered martensite contained in the microstructure has a correlation with a difference between a maximum value and a minimum value of the Rockwell hardness (HRC) in the steel material after quenching and tempering.

The maximum value of the Rockwell hardness after quenching and tempering is defined as "HRCmax". The minimum value of the Rockwell hardness after quenching and tempering is defined as "HRCmin". The difference between HRCmax and HRCmin is defined as "ΔHRC".

ΔHRC=HRCmax−HRCmin

When ΔHRC is less than 2.0, the volume ratio of tempered martensite in the microstructure of the steel material is regarded as being 90% or more.

For example, the Rockwell hardness at the steel material surface is HRCmax, and the Rockwell hardness at a center section of the thickness of the steel material (hereunder, referred to as "steel material center section") is HRCmin. The reason is as follows. The cooling rate during quenching and cooling is fast at the steel material surface and is slow at the steel material center section. Accordingly, in the steel material as it is in a quenched state, in some cases a large difference arises with respect to the martensite volume ratio between the steel material surface and the steel material center section. Because the volume ratio of martensite in the microstructure has a correlation with the Rockwell hardness, in this case the difference in the Rockwell hardness between the steel material surface and the steel material center section in the quenched state is large. When the steel material is subjected to tempering, although the hardness decreases at both the steel material surface and the steel material center section, and the difference between the Rockwell hardness at the steel material surface and the steel material center section also becomes smaller, a difference in the Rockwell hardness between the steel material surface and the steel material center section remains. Therefore, the Rockwell hardness at the steel material surface is HRCmax, and the Rockwell hardness at the steel material center section is HRCmin. If ΔHRC is 2.0 or more, the hardness at the steel material center section is too low. If ΔHRC is less than 2.0, sufficient hardness is also obtained in the steel material center section, and in this case the volume ratio of tempered martensite in the steel material center section is regarded as being 90% or more.

The following method is used to measure ΔHRC. The Rockwell hardness (HRC) is determined by conducting a Rockwell hardness test (C scale) according to JIS Z2245 (2011) at an arbitrary three places at positions at a depth of 2.0 mm from the surface of the steel material (outer surface in the case of a steel pipe) after quenching and tempering, at positions at a depth of 2.0 mm from the rear surface of the steel material (inner surface in the case of a steel pipe), and at middle positions in the thickness direction of the steel material, respectively. The maximum value of the obtained hardness is taken as HRCmax and the minimum value is taken as HRCmin, and if ΔHRC is less than 2.0 it is determined that the volume ratio of tempered martensite is 90% or more. If ΔHRC is 2.0 or more, it is determined that the volume ratio of tempered martensite at the position of HRCmin is less than 90%.

[Shape of Steel Material]

The shape of the steel material is not particularly limited. The steel material is, for example, a steel pipe or a steel plate. In a case where the steel material is a steel pipe for oil wells, a preferable wall thickness is 9 to 60 mm. The present invention is, in particular, suitable for use as oil-well steel pipe with a heavy wall. More specifically, even if the steel material according to the present invention is an oil-well steel pipe with a heavy wall of 15 mm or more or, furthermore, 20 mm or more, the steel material exhibits an excellent strength and SSC resistance.

[Strength of Steel Material]

A preferable lower limit of the yield strength of the steel material is 654 MPa. The upper limit of the yield strength of the steel material is 860 MPa. In the present description, the term "yield strength" means the lower yield point (MPa).

[Production Method]

A method for producing an oil-well steel pipe will now be described as one example of a method for producing the above described steel material. The method for producing an oil-well steel pipe includes a process of preparing a starting material (preparation process), a process of subjecting the starting material to hot working to produce a hollow shell (hot working process), and a processes of subjecting the hollow shell to quenching and tempering to obtain an oil-well steel pipe (quenching process and tempering process). Each of these processes is described in detail hereunder.

[Preparation Process]

Molten steel having the above described chemical composition and satisfying expression (1) and expression (2) is produced. A starting material is produced using the molten steel. Specifically, a cast piece (a slab, bloom or billet) is produced by a continuous casting process using the molten steel. An ingot may also be produced by an ingot-making process using the molten steel. As necessary, the slab, bloom or ingot may be subjected to billeting to produce a billet. A starting material (a slab, bloom or billet) is produced by the above described processes.

[Hot Working Process]

The prepared starting material is subjected to hot working to produce a hollow shell. First, the billet is heated in a heating furnace. The billet that is extracted from the heating furnace is subjected to hot working to produce a hollow shell (seamless steel pipe). For example, the Mannesmann process is performed as the hot working to produce the hollow shell. In this case, a round billet is piercing-rolled using a piercing machine. The piercing-rolled round billet is further hot-rolled into a hollow shell using a mandrel mill, a reducer, a sizing mill or the like.

The hollow shell may also be produced from the billet by another hot working method. For example, in the case of a heavy-walled oil-well steel pipe of a short length such as a coupling, a hollow shell may be produced by forging. By the above processes, a hollow shell having a wall thickness of 9 to 60 mm is produced.

The hollow shell produced by hot working may be air-cooled (as-rolled). The steel pipe produced by hot working may be subjected either to quenching directly after hot rolling without being cooled to normal temperature, or to concurrent heating (reheating) subsequent to hot rolling before being subjected to quenching. However, in the case of performing quenching directly or after concurrent heating, it is preferable to stop cooling during the quenching process or conduct slow cooling for the purpose of suppressing quench cracking.

In a case where quenching is performed directly after hot rolling, or after concurrent heating subsequent to hot rolling, for the purpose of eliminating residual stress it is preferable to perform a stress relief treatment (SR treatment) at a time that is after quenching and before the heat treatment of the next process. The quenching process is described in detail hereunder.

[Quenching Process]

Quenching is performed on the hollow shell after hot working. The preferable quenching temperature is 850 to 1000° C.

Preferably, forced cooling is started at a cooling rate of 5° C./sec or more before the temperature at the latest cooling point becomes the $Ar_3$ temperature or less. In such a case, it is easy to further increase the yield strength.

Quenching may be performed a plurality of times. In the case of performing quenching a plurality of times, preferably, after quenching and prior to performing quenching at the next stage, an SR treatment is performed for the purpose of removing residual stress that is generated by the quenching. The occurrence of delayed cracks after quenching can be prevented by the SR treatment. In the case of performing an SR treatment, a preferable treatment temperature is 600° C. or less. In this case, coarsening of austenite can be suppressed.

[Tempering Process]

Tempering is performed after performing the above described quenching. The yield strength of the steel material can be adjusted by tempering. A preferable lower limit of the tempering temperature is 650° C. A preferable upper limit of the tempering temperature is 730° C.

A method for producing a steel pipe has been described as one example of the aforementioned production method. However, the steel material of the present invention may be a steel plate or another shape, and a method for producing the steel plate also similarly includes a preparation process, a hot working process, a quenching process and a tempering process.

EXAMPLES

[Method for Producing Test Material]

Molten steel with a weight of 180 kg having the chemical compositions illustrated in Table 1 was produced.

TABLE 1

| | Chemical Composition (unit is percent by mass. balance is Fe and impurities) | | | | | | | | | | | | |
|---|---|---|---|---|---|---|---|---|---|---|---|---|---|
| Steel | C | Si | Mn | P | S | Al | N | Cr | Mo | Co | Cu | Ni | Ti |
| 1 | 0.25 | 0.30 | 0.45 | 0.020 | 0.003 | 0.030 | 0.004 | 1.05 | 0.70 | 0.70 | — | — | — |
| 2 | 0.28 | 0.31 | 0.40 | 0.015 | 0.001 | 0.032 | 0.004 | 0.50 | 0.70 | 0.50 | 0.03 | 0.11 | — |
| 3 | 0.27 | 0.28 | 0.42 | 0.015 | 0.001 | 0.033 | 0.003 | 0.90 | 1.10 | 1.30 | — | — | — |
| 4 | 0.27 | 0.27 | 0.63 | 0.015 | 0.001 | 0.028 | 0.003 | 1.25 | 1.73 | 2.55 | — | — | — |

TABLE 1-continued

| | | | | | | | | | | | | | |
|---|---|---|---|---|---|---|---|---|---|---|---|---|---|
| 5 | 0.38 | 0.42 | 0.40 | 0.017 | 0.002 | 0.038 | 0.003 | 1.05 | 1.21 | 0.56 | — | — | 0.010 |
| 6 | 0.27 | 0.26 | 0.44 | 0.017 | 0.002 | 0.035 | 0.003 | 1.00 | 0.70 | 0.61 | — | — | 0.012 |
| 7 | 0.26 | 0.28 | 0.28 | 0.017 | 0.002 | 0.038 | 0.003 | 0.55 | 0.73 | 1.18 | 0.03 | 0.04 | 0.012 |
| 8 | 0.30 | 0.51 | 0.73 | 0.019 | 0.001 | 0.032 | 0.003 | 0.31 | 1.21 | 0.88 | 0.03 | 0.04 | 0.012 |
| 9 | 0.23 | 0.28 | 0.35 | 0.017 | 0.002 | 0.038 | 0.003 | 0.56 | 1.21 | 2.20 | 0.03 | — | 0.012 |
| 10 | 0.27 | 0.31 | 0.44 | 0.015 | 0.002 | 0.033 | 0.002 | 0.50 | 0.70 | 2.80 | — | — | 0.010 |
| 11 | 0.20 | 0.29 | 0.69 | 0.015 | 0.001 | 0.028 | 0.003 | 0.97 | 0.70 | 0.52 | — | — | 0.009 |
| 12 | 0.25 | 0.33 | 0.47 | 0.016 | 0.001 | 0.031 | 0.004 | 0.45 | 0.28 | 0.91 | 0.05 | 0.07 | 0.014 |
| 13 | 0.27 | 0.33 | 0.47 | 0.016 | 0.001 | 0.035 | 0.004 | 1.00 | 1.20 | 0.25 | 0.02 | 0.04 | 0.014 |
| 14 | 0.26 | 0.34 | 1.10 | 0.017 | 0.002 | 0.038 | 0.004 | 1.00 | 1.21 | 1.10 | — | — | 0.015 |
| 15 | 0.16 | 0.34 | 0.45 | 0.017 | 0.002 | 0.038 | 0.004 | 2.95 | 1.21 | 1.10 | — | — | 0.015 |
| 16 | 0.27 | 0.30 | 0.41 | 0.015 | 0.002 | 0.036 | 0.003 | 1.00 | 0.70 | 5.05 | — | — | 0.006 |
| 17 | 0.51 | 0.30 | 0.41 | 0.015 | 0.002 | 0.036 | 0.003 | 1.00 | 0.70 | 5.05 | — | — | 0.006 |
| 18 | 0.26 | 0.25 | 0.44 | 0.013 | 0.002 | 0.037 | 0.003 | 1.03 | 0.68 | — | — | — | 0.008 |
| 19 | 0.25 | 0.30 | 0.45 | 0.020 | 0.003 | 0.030 | 0.004 | 0.45 | 0.75 | 0.84 | — | — | — |
| 20 | 0.26 | 0.33 | 0.85 | 0.016 | 0.002 | 0.035 | 0.005 | 1.00 | 0.85 | 0.56 | — | — | 0.015 |
| 21 | 0.27 | 0.34 | 0.85 | 0.008 | 0.002 | 0.033 | 0.004 | 1.00 | 1.10 | 3.30 | — | — | 0.015 |
| 22 | 0.28 | 0.30 | 0.40 | 0.008 | 0.001 | 0.035 | 0.004 | 1.00 | 0.78 | 0.90 | — | — | 0.015 |

| | Chemical Composition (unit is percent by mass. balance is Fe and impurities) | | | | | | | Effective | | |
|---|---|---|---|---|---|---|---|---|---|---|
| Steel | Nb | V | B | Ca | Mg | Zr | REM | B | F1 | F2 |
| 1 | — | — | — | — | — | — | — | 0 | 0.56 | 1.5 |
| 2 | — | — | — | — | — | — | — | 0 | 0.51 | 1.8 |
| 3 | 0.015 | 0.070 | — | — | — | — | — | 0 | 0.54 | 2.7 |
| 4 | 0.025 | 0.100 | — | — | — | — | — | 0 | 0.57 | 3.3 |
| 5 | 0.025 | 0.060 | 0.0013 | 0.0015 | — | — | — | 0.0013 | 1.07 | 1.8 |
| 6 | 0.025 | 0.060 | 0.0013 | — | 0.0016 | — | — | 0.0017 | 0.84 | 1.4 |
| 7 | 0.040 | 0.110 | 0.0013 | — | — | 0.0011 | — | 0.0017 | 0.64 | 3.6 |
| 8 | 0.019 | 0.060 | 0.0013 | 0.0007 | — | — | — | 0.0017 | 0.85 | 1.9 |
| 9 | 0.040 | 0.060 | 0.0013 | — | — | — | 0.0015 | 0.0017 | 0.54 | 5.3 |
| 10 | 0.025 | 0.100 | 0.0012 | — | — | — | — | 0.0019 | 0.39 | 5.5 |
| 11 | 0.015 | 0.030 | 0.0011 | — | — | — | — | 0.0008 | 0.82 | 0.9 |
| 12 | 0.024 | 0.050 | 0.0010 | 0.0008 | — | — | — | 0.0011 | 0.59 | 2.0 |
| 13 | 0.043 | 0.050 | 0.0010 | 0.0008 | — | — | — | 0.0011 | 1.01 | 1.1 |
| 14 | 0.040 | 0.080 | 0.0013 | 0.0015 | — | — | — | 0.0016 | 0.97 | 1.2 |
| 15 | 0.040 | 0.030 | 0.0013 | 0.0015 | — | — | — | 0.0016 | 1.14 | 1.2 |
| 16 | 0.016 | 0.095 | — | — | — | — | — | 0 | −0.14 | 7.5 |
| 17 | 0.015 | 0.095 | 0.0012 | — | — | — | — | 0.0005 | 0.35 | 7.8 |
| 18 | 0.030 | 0.100 | 0.0013 | — | — | — | — | 0.0006 | 0.95 | 0.6 |
| 19 | — | — | — | — | — | — | — | 0 | 0.43 | 2.2 |
| 20 | 0.015 | 0.050 | 0.0013 | 0.0013 | — | — | — | 0.0008 | 0.94 | 0.9 |
| 21 | 0.015 | 0.070 | 0.0013 | 0.0013 | — | — | — | 0.0016 | 0.55 | 3.3 |
| 22 | 0.015 | — | 0.0012 | 0.0008 | 0.0002 | — | — | 0.0015 | 0.80 | 2.0 |

Ingots were produced using the above described molten steel. The ingots were hot rolled to produce steel plates. The thicknesses of the steel plates were as shown in Table 2.

TABLE 2

| | | Quenching | Tempering | | | | | $K_{ISSC}$ (MPa√m) | | | |
|---|---|---|---|---|---|---|---|---|---|---|---|
| Steel | Thickness (mm) | Temperature (° C.) | Temperature (° C.) | YS (MPa) | TS (MPa) | ΔHRC | Microstructure Determination | 1 | 2 | 3 | Average Value |
| 1 | 15 | 880 | 700 | 690 | 758 | 1.2 | Pass | 53.0 | 49.1 | 48.5 | 50.2 |
| 2 | 15 | 900 | 700 | 724 | 787 | 1.0 | Pass | 48.3 | 47.4 | 47.9 | 47.9 |
| 3 | 15 | 910 | 705 | 800 | 870 | 1.1 | Pass | 37.3 | 36.8 | 37.2 | 37.1 |
| 4 | 16 | 940 | 710 | 807 | 868 | 1.2 | Pass | 39.2 | 38.3 | 37.5 | 38.3 |
| 5 | 60 | 920 | 715 | 793 | 881 | 1.7 | Pass | 36.1 | 36.5 | 37.0 | 36.5 |
| 6 | 55 | 930 | 705 | 827 | 909 | 1.5 | Pass | 35.0 | 35.6 | 35.4 | 35.3 |
| 7 | 25 | 900 | 700 | 830 | 892 | 1.3 | Pass | 36.5 | 37.2 | 35.8 | 36.5 |
| 8 | 35 | 925 | 715 | 841 | 914 | 1.5 | Pass | 36.2 | 36.4 | 35.4 | 36.0 |
| 9 | 15 | 920 | 700 | 845 | 925 | 1.1 | Pass | 37.5 | 38.2 | 38.3 | 38.0 |
| 10 | 25 | 900 | 700 | 697 | 766 | 2.8 | Fail | 24.3 | 22.3 | 24.1 | 23.6 |
| 11 | 20 | 900 | 700 | 715 | 794 | 0.9 | Pass | 30.3 | 31.4 | 33.3 | 31.7 |
| 12 | 15 | 900 | 700 | 760 | 840 | 1.3 | Pass | 25.8 | 27.2 | 24.8 | 25.9 |
| 13 | 15 | 920 | 700 | 777 | 845 | 1.5 | Pass | 20.7 | 28.4 | 24.3 | 24.5 |
| 14 | 15 | 900 | 700 | 753 | 835 | 1.2 | Pass | 22.4 | 29.8 | 24.3 | 25.5 |
| 15 | 15 | 920 | 685 | 763 | 850 | 1.3 | Pass | 22.6 | 23.8 | 26.4 | 24.3 |
| 16 | 15 | 900 | 700 | 816 | 920 | 2.5 | Fail | 36.8 | 33.0 | 26.0 | 31.9 |
| 17 | 15 | 900 | 710 | 852 | 988 | 3.0 | Fail | 27.2 | 26.8 | 28.5 | 27.5 |
| 18 | 15 | 900 | 710 | 808 | 888 | 1.2 | Pass | 22.8 | 22.6 | 22.8 | 22.7 |
| 19 | 15 | 900 | 700 | 765 | 869 | 2.6 | Fail | 23.5 | 26.5 | 21.5 | 23.8 |

TABLE 2-continued

| | | Quenching | Tempering | | | | | $K_{ISSC}$ (MPa√m) | | | |
| --- | --- | --- | --- | --- | --- | --- | --- | --- | --- | --- | --- |
| Steel | Thickness (mm) | Temperature (° C.) | Temperature (° C.) | YS (MPa) | TS (MPa) | ΔHRC | Microstructure Determination | 1 | 2 | 3 | Average Value |
| 20 | 15 | 900 | 700 | 820 | 910 | 1.1 | Pass | 27.5 | 26.5 | 29.3 | 27.8 |
| 21 | 20 | 900 | 700 | 783 | 900 | 2.6 | Fail | 35.1 | 30.5 | 28.5 | 31.4 |
| 22 | 15 | 900 | 710 | 720 | 791 | 1.0 | Pass | 51.5 | 50.7 | 52.0 | 51.4 |

Quenching at the quenching temperatures shown in Table 2 was performed on the respective steel plates after hot rolling. After quenching, tempering at the tempering temperature shown in Table 2 was performed on the respective steel plates. In the tempering, the tempering temperatures were adjusted so that the yield strengths of the steel plates of steels 1, 2, 10, 11 and 22 became equivalent to the yield strength of T95 grade as specified in the API standards (yield strength of 655 to 760 MPa), and the yield strengths of the steel plates of the other steels became equivalent to the yield strength of C110 grade as specified in the API standards (yield strength of 760 to 862 MPa). The retention time at the tempering temperature was 60 minutes for each steel plate. The steel plates of steel 1 to steel 22 were produced by the above production processes.

[Yield Strength (YS) and Tensile Strength (TS) Test]

Round bar tensile test specimens having a diameter of 6.35 mm and a parallel length of 35 mm were prepared from the center part with respect to the thickness of each steel plate after the above described quenching and tempering. The axial direction of each of the tensile test specimens was parallel to the rolling direction of the steel plates. A tensile test was performed in the atmosphere at normal temperature (25° C.) using each round bar test specimen, and the yield strength YS (MPa) and tensile strength (TS) at respective positions were obtained. Note that, in the present examples, a lower yield point obtained by the tensile test was defined as the yield strength (YS) for each test number.

[Evaluation Tests]

[Microstructure Determination Test]

A Rockwell hardness (HRC) test in accordance with JIS Z 2245 (2011) was performed on each steel plate after the above described quenching and tempering. Specifically, the Rockwell hardness (HRC) was determined at an arbitrary three places at positions at a depth of 2.0 mm from the surface of the steel material, at positions at a depth of 2.0 mm from the rear surface of the steel material (inner surface in the case of a steel pipe), and at middle positions in the thickness direction of the steel material, respectively. When the difference ΔHRC between the maximum value and minimum value of the Rockwell hardness at the nine points was less than 2.0, the volume ratio of tempered martensite even at the position of HRCmin was regarded as being 90% or more, and it was determined that the relevant steel plate passed the test. When the difference ΔHRC was 2.0 or more, the volume ratio of tempered martensite at the position of HRCmin was regarded as being less than 90%, and it was determined that the relevant steel plate failed the test. The determinations regarding pass or fail are shown in Table 2.

[DCB Test]

Figure 3A:
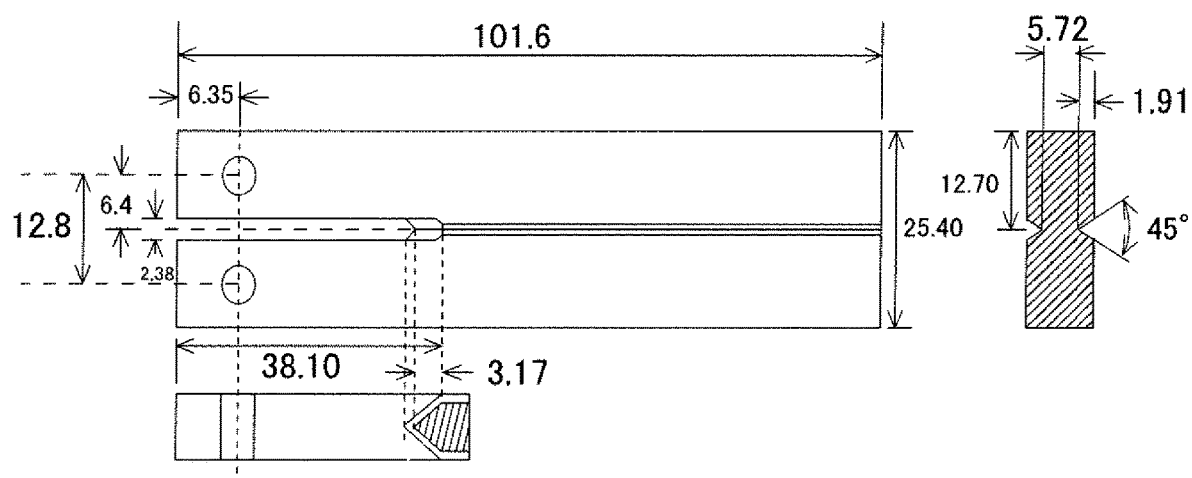
FIG. 3A illustrates a side view and a sectional view of a DCB test specimen that is used in a DCB test in the examples. The numbers in FIG. 3A indicate length (the unit is in "mm") of each corresponded part.
Figure 3B:
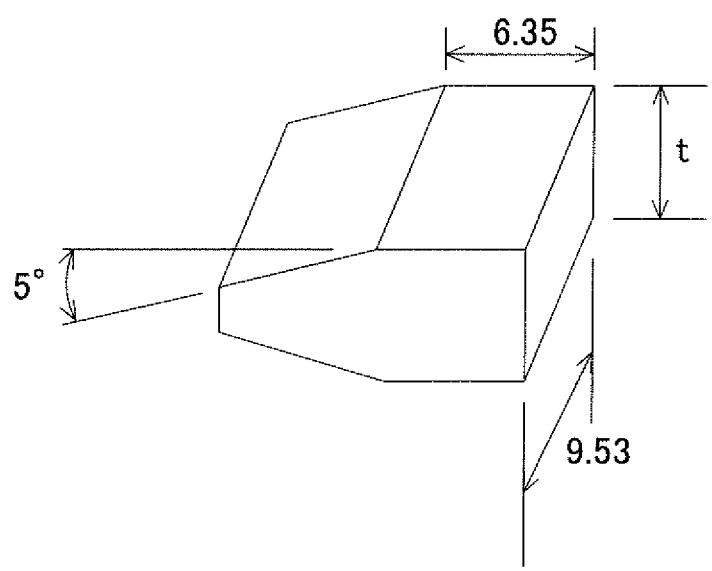
FIG. 3B is a perspective view of a wedge that is used in the DCB test in the examples. The numbers in FIG. 3B indicate length (the unit is in "mm") of each corresponded part.

Using each steel plate, a DCB test in accordance with NACE TM0177-96 Method D was conducted and the SSC resistance was evaluated. Specifically, three of the DCB test specimen illustrated in FIG. 3A were extracted from a section at the center in the wall thickness of each steel plate. A wedge shown in FIG. 3B was further prepared from each steel plate. A thickness t of the wedge was 2.92 mm. Note that the numbers in FIG. 3A and FIG. 3B indicate length (the unit is in "mm") of each corresponded part.

The wedge was driven in between the arms of the DCB test specimen. Thereafter, the DCH test specimen into which the wedge was driven was enclosed in an autoclave. A liquid solution obtained by mixing a degassed 5% saline solution, acetic acid and sodium acetate, and adjusting to pH 3.5 was poured into the autoclave so that a gas portion remained in the autoclave. Thereafter, hydrogen sulfide gas at 10 atm was charged under pressurization inside the autoclave to agitate the liquid phase, and the high-pressure hydrogen sulfide gas was saturated in the liquid solution.

After sealing the autoclave that had been subjected to the above described processes, the autoclave was retained for 336 hours at 25° C. while agitating the liquid solution. Thereafter the autoclave was depressurized and the DCB test specimens were taken out.

A pin was inserted into a hole formed in the tip of the arms of each DCB test specimen that was taken out and a notch portion was opened with a tensile testing machine, and a wedge releasing stress P was measured. In addition, the notch in the DCB test specimen was released in liquid nitrogen, and a crack propagation length a during immersion was measured. The crack propagation length a was measured visually using vernier calipers. A fracture toughness value $K_{ISSC}$ (MPa√m) was determined using expression (4) based on the obtained wedge releasing stress P and the crack propagation length a.

[Expression 1]

$$K_{Issc} = \frac{Pa\left(2\sqrt{3} + 2.38\frac{h}{a}\right)\left(\frac{B}{B_n}\right)^{1/\sqrt{3}}}{Bh^{3/2}} \quad (4)$$

In expression (4), h represents the height (mm) of each arm of the DCB test specimen, B represents the thickness (mm) of the DCB test specimen, and Bn represents the web thickness (mm) of the DCB test specimen. These are defined in NACE TM0177-96 Method D.

The fracture toughness value $K_{ISSC}$ (MPa√m) was determined for three DCB test specimens for each test number. For each steel plate, the average of the fracture toughness values for the three DCB test specimens was defined as the fracture toughness value $K_{ISSC}$ (MPa√m) of the relevant steel plate. The obtained fracture toughness values $K_{ISSC}$ are shown in Table 2. For the steel plates of steels 1, 2, 10, 11 and 22 (equivalent to T95 grade of the API standards), if the above-defined fracture toughness value $K_{ISSC}$ was 47 MPa√m or more, the SSC resistance was determined as good. For the other steels (equivalent to C110 grade of the API standards), if the above-defined fracture toughness value $K_{ISSC}$ was 35 MPa√m or more, the SSC resistance was determined as good. Note that, the clearance between the arms when the wedge was driven in prior to immersion in the test bath influences the $K_{ISSC}$ value. Accordingly, actual measurement of the clearance between the arms was performed in advance using a micrometer, and it was also confirmed that the clearance was within the range in the API standards.

[Test Results]

The test results are shown in Table 2.

The chemical compositions of the steel plates made of steels 1 to 9 and 22 were suitable and satisfied expression (1) and expression (2). In addition, because ΔHRC was less than 2.0, the steel plates passed the microstructure determination, and martensite accounted for 90% or more by volume ratio of the microstructure. As a result, the $K_{ISSC}$ values of the steels 1, 2 and 22 were 47 MPa√m or more, and the $K_{ISSC}$ values of the steels 3 to 9 were 35 MPa√m or more, indicating excellent SSC resistance. Note that the yield strengths of the steels 1 and 2 were 654 MPa or more and the yield strengths of the steels 3 to 9 were 760 MPa or more.

On the other hand, in the steel plate made of steel 10, F1 was less than the lower limit of expression (1). Therefore, because the hardenability decreased and ΔHRC was 2.0 or more, the steel plate failed the microstructure determination, and the volume ratio of tempered martensite in the microstructure was less than 90%. Consequently, the $K_{ISSC}$ value was less than 47 MPa√m and the SSC resistance was low. It is considered that the fracture toughness value $K_{ISSC}$ was low because the microstructure was a heterogeneous structure containing a large amount of bainite together with the tempered martensite.

In the steel plate made of steel 11, F2 was less than the lower limit of expression (2). As a result, the $K_{ISSC}$ value was less than 47 MPa√m and the SSC resistance was low. It is considered that the ratio of the content of elements that improve SSC resistance (C, Mo and Co) to the content of Mn and Cr was too low, and consequently the SSC resistance was low.

In the steel plate made of steel 12, the Mo content was low. As a result, the $K_{ISSC}$ value was less than 35 MPa√m and the SSC resistance was low.

In the steel plate made of steel 13, the Co content was low. As a result, the $K_{ISSC}$ value was less than 35 MPa√m and the SSC resistance was low.

In the steel plate made of steel 14, the Mn content was high. As a result, the $K_{ISSC}$ value was less than 35 MPa√m and the SSC resistance was low.

In the steel plate made of steel 15, the Cr content was high. As a result, the $K_{ISSC}$ value was less than 35 MPa√m and the SSC resistance was low.

In the steel plate made of steel 16, the Co content was too high, and F1 was less than the lower limit of expression (1). Therefore, because the hardenability decreased and ΔHRC was 2.0 or more, the steel plate failed the microstructure determination, and the martensite volume ratio in the microstructure was less than 90%. Consequently, the $K_{ISSC}$ value was less than 35 MPa√m and the SSC resistance was low.

In the steel plate made of steel 17, the C content and Co content were too high, and F1 was less than the lower limit of expression (1). Therefore, because the hardenability decreased and ΔHRC was 2.0 or more, the steel plate failed the microstructure determination, and the martensite volume ratio in the microstructure was less than 90%. Consequently, the $K_{ISSC}$ value was less than 35 MPa√m and the SSC resistance was low.

The steel plate made of steel 18 did not contain Co, and F2 was less than the lower limit of expression (2). Consequently, the $K_{ISSC}$ value was less than 35 MPa√m and the SSC resistance was low.

In the steel plate made of steel 19, F1 was less than the lower limit of expression (1). Therefore, because the hardenability decreased and ΔHRC was 2.0 or more, the steel plate failed the microstructure determination, and the volume ratio of tempered martensite in the microstructure was less than 90%. Consequently, the $K_{ISSC}$ value was less than 35 MPa√m and the SSC resistance was low. It is considered that the fracture toughness value $K_{ISSC}$ was low because the microstructure was a heterogeneous structure containing a large amount of bainite together with the tempered martensite.

In the steel plate made of steel 20, F2 was less than the lower limit of expression (2). As a result, the $K_{ISSC}$ value was less than 35 MPa√m and the SSC resistance was low. It is considered that the ratio of the content of elements that improve SSC resistance (C, Mo and Co) to the content of Mn and Cr was too low, and consequently the SSC resistance was low.

In the steel plate made of steel 21, the C content was too high. Therefore, because the hardenability decreased and ΔHRC was 2.0 or more, the steel plate failed the microstructure determination, and the martensite volume ratio in the microstructure was less than 90%. Consequently, the $K_{ISSC}$ value was less than 35 MPa√m and the SSC resistance was low.

An embodiment of the present invention has been described above. However, the above described embodiment is merely an example for implementing the present invention. Accordingly, the present invention is not limited to the above described embodiment, and the above described embodiment can be appropriately modified and implemented within a range which does not deviate from the technical scope of the present invention.

INDUSTRIAL APPLICABILITY

The steel material according to the present invention is widely applicable to steel materials utilized in a sour environment, and preferably is utilizable as a steel material for oil wells that is utilized in an oil well environment, and further preferably is utilizable as oil-well steel pipes, such as casing, tubing and line pipes.

The invention claimed is:

1. A steel material comprising a chemical composition consisting of, in mass%,
C: 0.15 to 0.45%,
Si: 0.10 to 1.0%,
Mn: 0.10 to less than 0.90%,
P: 0.05% or less,
S: 0.01% or less,
Al: 0.01 to 0.1%,
N: 0.010% or less,
Cr: 0.1 to 2.5%,
Mo: 0.35 to 3.0%,
Co: 0.50 to 3.0%,
Cu: 0 to 0.5%,
Ni: 0 to 0.5%,
Ti: 0 to 0.03%,
Nb: 0 to 0.15%,
V: 0 to 0.5%,
B: 0 to 0.003%,
Ca: 0 to 0.004%,
Mg: 0 to 0.004%, Zr: 0 to 0.004%, and
rare earth metal: 0 to 0.004%,
with a balance being Fe and impurities, and satisfying expressions (1) and (2),
wherein the microstructure comprises, by volume ratio, 90% or more of tempered martensite:

$$C+Mn/6+(Cr+Mo+V)/5+(Cu+Ni)/15 - Co/6+\alpha \geq 0.50 \quad (1)$$

$$(3\,C+Mo+3\,Co)/(3\,Mn+Cr) \geq 1.0 \quad (2)$$

$$\text{Effective } B = B - 11(N-Ti/3.4)/14 \quad (3)$$

where, α in expression (1) is 0.250 when effective B (mass %) defined by expression (3) is 0.0003 % or more, and is 0 when the effective B is less than 0.0003%, where a content (mass %) of a corresponding element is substituted for each symbol of an element in expression (1) to expression (3).

2. The steel material according to claim 1, wherein the chemical composition contains one or more types of element selected from a group consisting of:
Ca: 0.0003 to 0.004%,
Mg: 0.0003 to 0.004%,
Zr: 0.0003 to 0.004%, and
rare earth metal: 0.0003 to 0.004%.

3. An oil-well steel pipe comprising:
a chemical composition according to claim 1, and
a wall thickness of 15mm or more.

4. The steel material according to claim 1, wherein the chemical composition contains one or more types of element selected from a group consisting of:
Cu: 0.02 to 0.5%, and
Ni: 0.02 to 0.5%.

5. The steel material according to claim 4, wherein the chemical composition contains one or more types of element selected from a group consisting of:
Ti: 0.003 to 0.03%,
Nb: 0.003 to 0.15%, and
V: 0.005 to 0.5%.

6. The steel material according to claim 5, wherein the chemical composition contains:
B: 0.0003 to 0.003%.

7. The steel material according to claim 6, wherein the chemical composition contains one or more types of element selected from a group consisting of:
Ca: 0.0003 to 0.004%,
Mg: 0.0003 to 0.004%,
Zr: 0.0003 to 0.004%, and
rare earth metal: 0.0003 to 0.004%.

8. The steel material according to claim 5, wherein the chemical composition contains one or more types of element selected from a group consisting of:
Ca: 0.0003 to 0.004%,
Mg: 0.0003 to 0.004%,
Zr: 0.0003 to 0.004%, and
rare earth metal: 0.0003 to 0.004%.

9. The steel material according to claim 4, wherein the chemical composition contains:
B: 0.0003 to 0.003%.

10. The steel material according to claim 9, wherein the chemical composition contains one or more types of element selected from a group consisting of:
Ca: 0.0003 to 0.004%,
Mg: 0.0003 to 0.004%,
Zr: 0.0003 to 0.004%, and
rare earth metal: 0.0003 to 0.004%.

11. The steel material according to claim 4, wherein the chemical composition contains one or more types of element selected from a group consisting of:
Ca: 0.0003 to 0.004%,
Mg: 0.0003 to 0.004%,
Zr: 0.0003 to 0.004%, and
rare earth metal: 0.0003 to 0.004%.

12. The steel material according to claim 1, wherein the chemical composition contains one or more types of element selected from a group consisting of:
Ti: 0.003 to 0.03%,
Nb: 0.003 to 0.15%, and
V: 0.005 to 0.5%.

13. The steel material according to claim 12, wherein the chemical composition contains:
B: 0.0003 to 0.003%.

14. The steel material according to claim 13, wherein the chemical composition contains one or more types of element selected from a group consisting of:
Ca: 0.0003 to 0.004%,
Mg: 0.0003 to 0.004%,
Zr: 0.0003 to 0.004%, and
rare earth metal: 0.0003 to 0.004%.

15. The steel material according to claim 12, wherein the chemical composition contains one or more types of element selected from a group consisting of:
Ca: 0.0003 to 0.004%,
Mg: 0.0003 to 0.004%,
Zr: 0.0003 to 0.004%, and
rare earth metal: 0.0003 to 0.004%.

16. The steel material according to claim 1, wherein the chemical composition contains:
B: 0.0003 to 0.003%.

17. The steel material according to claim 16, wherein the chemical composition contains one or more types of element selected from a group consisting of:
Ca: 0.0003 to 0.004%,
Mg: 0.0003 to 0.004%,
Zr: 0.0003 to 0.004%, and
rare earth metal: 0.0003 to 0.004%.

* * * * *